United States Patent [19]

Gross

[11] 4,211,747
[45] Jul. 8, 1980

[54] SYSTEM FOR MEASURING RADIOACTIVITY OF LABELLED BIOPOLYMERS

[76] Inventor: Valery N. Gross, ulitsa Poddubnogo, 6, Alma-Ata, U.S.S.R.

[21] Appl. No.: 826,664

[22] Filed: Aug. 22, 1977

[30] Foreign Application Priority Data

Aug. 23, 1976 [SU] U.S.S.R. ............................ 2398268
Sep. 1, 1976 [SU] U.S.S.R. ............................ 2419312

[51] Int. Cl.² .................... G01N 33/16; G01N 1/14
[52] U.S. Cl. ............................... 422/81; 23/230.3; 250/328; 364/497
[58] Field of Search ............... 23/230.3, 230.6, 253 R, 23/253 A, 230 B; 424/1; 422/81; 250/328; 364/497

[56] References Cited

U.S. PATENT DOCUMENTS

| | | | |
|---|---|---|---|
| 3,117,842 | 1/1964 | Dewey | 23/230.6 X |
| 3,557,077 | 1/1971 | Brunfeldt et al. | 23/253 A |
| 3,647,390 | 3/1972 | Kubodera et al. | 23/253 A |
| 3,954,411 | 5/1976 | Snyder | 23/230.3 X |
| 4,000,252 | 12/1976 | Kosak | 23/230.3 X |

Primary Examiner—R. E. Serwin
Attorney, Agent, or Firm—Steinberg & Blake

[57] ABSTRACT

A system for measuring radioactivity of labelled biopolymers which comprises an electric drive to ensure stepwise travel of a set of containers, a means for acid precipitation of biopolymers for proportioned feeding of biopolymers to the containers with a biological sample of a coprecipitator and a suspension of diatomite in an acid solution, a means for taking precipitated samples from the containers, and a means for filtering precipitated biopolymers. The system also includes a program unit with a control unit to interact with the above means. The mixture is fed to a detection chamber of a radioactivity measuring device.

16 Claims, 3 Drawing Figures

SYSTEM FOR MEASURING RADIOACTIVITY OF LABELLED BIOPOLYMERS

FIELD OF THE INVENTION

The present invention relates to radioactivity measuring systems and, more particularly, to a system for measuring radioactivity of labelled biopolymers.

The proposed system is applicable, in the main, to biological and medicobiological research and the production of labelled biopolymers and their precursors. The system of this invention can be used to measure the radioactivity of labelled biopolymers contained in biological samples obtained by sedimentation and chromatographic separation of solution of biological preparations. The invention is further applicable to studies in the synthesis of proteins, nucleic acids and ribonucleoproteide particles in living organisms and artificial models of living organisms. Finally, the invention is applicable to the synthesis and purification of labelled biopolymers, as well as the separation and purification of labelled biopolymers precursors in industrial conditions.

BACKGROUND OF THE INVENTION

The growing effort on the part of molecular biology in the studies of the composition and structure, as well as the laws of development of living organisms, and in solving vital problems of medicine, pharmacology, agriculture and the food industry accounts for rapidly expanding utilization of radioactive indication in establishing the laws governing biological processes in which biopolymers play a major role.

The existing systems for measuring the radioactivity of labelled biopolymers are either not automated or automated only to a limited degree. Many laborious operations at the preparatory and concluding stages of the work are done by hand, which accounts for an inadequate accuracy of measurements and may lead to radioactive contamination of the environment. There is also a danger that the personnel may be exposed to radiation.

An automatic system for measuring the radioactivity of labelled bipolymers would free the researchers from labor-consuming operation involving the handling of radioactive and toxic substances and would be beneficial in many other respects. The most important benefits are as follows. First, the working conditions would be improved, and the danger of radioactive contamination would be reduced. Second, research would proceed much faster, and the quality of radiochemical products would be improved. Third, an automatic system would make it possible to dispense with all the manual operations. The latter factor would account for a substantial increase in the accuracy of measurements and provide conditions for mathematical processing of the results, including computerized processing.

There is known a system for measuring the radioactivity of labelled biopolymers, comprising a cooling chamber which accommodates a set of containers containing aqueous solutions of biological samples which, in turn, contain biopolymers. The latter are precipitated on particles of diatomite in the presence of a coprecipitator, filtered, dissolved, and mixed with a scintillator. The mixture thus produced is fed into a detection chamber of a radioactivity measuring device (cf. Techniques in Protein Biosynthesis, vol. 2, edited by P. N. Campbell and I. R. Sangent, Academic Press, London & New York, 1969, pp. 157-163).

This prior art system comprises a set of containers for aqueous solutions of biological samples produced with the aid of separation techniques, for example, ultracentrifugation or chromatography of labelled biological preparations. The set of containers is arranged in the cooling chamber in order to preserve the structure of biopolymers and provide conditions for acid precipitation. For acid precipitation, the system is provided with a vessel for a solution of a coprecipitator, a vessel for a suspension of finely divided diatomite in a solution of trichloracetic acid, a pipette for successive proportioned delivery to the containers of predetermined amounts of the coprecipitator solution and the suspension of finely divided diatomite in the solution of trichloracetic acid. For filtering that part of the sample that is precipitated on particles of diatomite in the containers, the system includes a filtering means comprising a cellulose filter installed in a filtering funnel connected to a vessel for sucked-in filtrate, which, in turn, communicates with a vacuum pump. Diatomite suspension is introduced into the funnel by means of a pipette. In order to dissolve the biomaterial of the precipitate in an organic solvent, the system includes a vessel for an organic solvent and a pipette by means of which a proportioned amount of an organic solvent is introduced into a cell containing a cellulose filter with precipitate. For mixing the contents of the cell of a liquid scintillation counter, the system includes a vessel for a scintillator and a pipette for introducing the scintillator into the cell. For the transfer of cells with the mixture of the detection chamber, the system includes an automatic conveyer and a means for introducing cells into the detection chamber. For the removal of a cell's contents after radioactivity measurements and for washing and drying the cells, the system includes pincers for the removal of the cellulose filter, a vessel for the discharge of the mixture, a vessel for a washing fluid, and a drier for drying washed cells.

The prior art system under review is such that all the operations, except for radioactivity measurements, are done by hand, which accounts for a low efficiency of the measuring process which, in addition, takes too much time. The manual proportioned delivery of fluids and the manual transfers of the cellulose filter with the powdered precipitate into the cell of the liquid scintillation counter lead to errors and considerably reduce the precision of measurements. In addition, the numerous manual operations involved in the analysis of each sample are bound to distract the analyst's attention if he or she has to analyze a great number of samples; the result is a greater probability of an error, for example, a wrong order in which the operations are performed. The manual operations clearly lead to errors and may be the cause of radioactive contamination of the environment with dire consequences for the analyst and all working near him.

BRIEF DESCRIPTION OF THE INVENTION

It is an object of the present invention to provide an automatic system for measuring the radioactivity of labelled biopolymers.

It is another object of the invention to rule out radioactive contamination of the environment while measuring the radioactivity of labelled biopolymers.

It is still another object of the invention to improve the accuracy of measuring the radioactivity of labelled biopolymers.

It is yet another object of the invention to speed up the process of measuring the radioactivity of labelled biopolymers.

It is a further object of the invention to improve the working conditions of those working with radioactive substances.

The present invention essentially consists in providing a system for measuring the radioactivity of labelled biopolymers, comprising a set of containers with aqueous solutions of biological samples containing biopolymers which are precipitated on diatomite particles in the presence of a coprecipitator, filtered, dissolved, mixed with a scintillator, whereupon the mixture thus produced is fed into a detection chamber of a radioactivity measuring device, the system including, in accordance with the invention, an electric drive for setting the set of containers in stepwise motion, a means for acid precipitation of biopolymers for proportioned feeding to the containers with biological samples of the coprecipitator and suspension of diatomite in an acid solution, a means for the removal of precipitated samples from the containers, a means for filtering precipitated biopolymers for successive filtration, suspending of the precipitate, dissolution of biopolymers and feeding, by means of a scintillator, of the mixture to a detection chamber, a measuring cell arranged in the detection chamber and connected by means of a pipeline to the means for filtering precipitated biopolymers, a program unit to periodically switch on and off the electric drive for setting the set of containers in stepwise motion, the means for acid precipitation of biopolymers, the means for the removal of precipitated samples from the containers, the means for filtering precipitated biopolymers, and the device for measuring radioactivity and checking the sequence of operations being performed, and a unit for controlling the initiation of the system and the selection of programs, electrically coupled to the program unit, the electric drive for setting the set of containers in stepwise motion, the means for acid precipitation of biopolymers, the means for the removal of precipitated samples from the containers, the means for filtering precipitated biopolymers, and the radioactivity measuring device.

It is expedient that the means for acid precipitation of biopolymers should include a vessel for a solution of a coprecipitator and a vessel for a suspension of finely divided diatomite in a solution of trichloracetic acid, provided with a stirrer, as well as two pneumatic batchers with an electromechanical drive coupled to the control unit, which pneumatic batchers are connected by means of pipelines to the respective vessels, the means for acid precipitation of biopolymers further including a mechanism for setting into reciprocating motion and adjusting the position of the ends of the pipelines with respect to the container, which mechanism is provided with a mechanical stirrer for mixing the contents of the container and connected by means of pipelines to the pneumatic batchers.

It is preferable that the means for taking precipitated samples from the containers should include a pipeline to pneumatically transfer a precipitated sample from the container to the means for filtering precipitated biopolymers, a pipeline for feeding a solution of trichloracetic acid to the container, and a mechanism for setting into reciprocating motion and adjusting the position of the ends of the pipelines with respect to the container with a precipitated sample, which mechanism is provided with a mechanical stirrer.

It is advisable that the means for filtering precipitated biopolymers should include a vessel for alcohol, a vessel for water, a vessel for alcohol-dioxane solution, a vessel for solution of trichloracetic acid, a vessel for suspension of diatomite in trichloracetic acid, provided with a stirrer, a vessel for a biopolymer solvent, a vessel for a scintillator, communicating with a vacuum pump, a vessel for a filtrate, and a six-way directional control valve with an electromechanical drive coupled to the control unit in order to successively communicate the central channel of the valve with the atmosphere, the vessel for alcohol and water, tne pneumatic batcher of the vessel for suspension of diatomite in trochloracetic acid, the means for the removal of precipitated samples from the containers, and the vessel for alcohol-dioxane solution, the means for filtering precipitated biopolymers further including a filtering chamber with a filtering partition dividing the filtering chamber into two cavities one of which is connected by means of a pipeline, whereupon there is mounted a three-way valve with a drive, to the central channel of the six-way directional control valve and the measuring cell, whereas the other cavity is connected by means of another pipeline, whereupon there is mounted a three-way valve with a drive, to the vessel for filtrate and the pneumatic batcher of the vessel for a biopolymer solvent; it is also advisable that the vessel for a solution of trichloracetic acid, the vesslel for suspension of diatomite in trichloracetic acid, the vessel for a biopolymer solution, and a vessel for a scintillator should each be provided with a pneumatic batcher with an electrochemical drive coupled to the control unit, the electromechanical drives of the batchers being coupled to the drives of the three-way valves.

It is desirable that the filtering chamber should be rigidly mounted on an axle arranged at a perpendicular to the direction of filtration, and provided with a drive coupled to the control unit and intended to rotate the filtering chamber about said axis through an angle of 180°.

It is preferable that the pneumatic batchers of the scintillator and solvent should include proportioning chambers communicating with the vessels for liquids to be proportioned by means of pipeline provided with locking means, whose ends are arranged inside the proportioning chambers communicating with pipelines for the discharge of a dose of fluid, provided with locking means, and also connected to pipelines with locking means to communicate with the atmosphere, a line for the supply of compressed carbon dioxide at a stabilized pressure and a stabilized vacuum line adapted for evacuation, the end of a pipeline for the discharge of a dose of scintillator from the proportioning chamber of the pneumatic batcher of the scintillator being arranged inside the proportioning chamber of the pneumatic batcher of the solvent, the cubic content of the pipeline being determined by that of the solvent dose.

It is expedient that the measuring cell should be provided with four holes for the supply of the mixture, carbon dioxide purging, the supply of a washing fluid, and the removal of the cell's contents, and that provision should be made for a vessel for washing liquid and a vessel for discharging mixture, communicating by means of pipelines, whereupon there are mounted locking means with electric drives, with the respective holes of the measuring cell, the cell itself being connected through the holes for the supply of the mixture and carbon dioxide purging and by means of pipelines to the filtering means and the line for the supply of compressed carbon dioxide at a stabilized pressure.

It is advisable that the measuring cell should be a hollow cylinder of polyfluoroethylene, whose end faces are covered with a film of polyfluoroethylene, said holes being provided on the lateral surface of the cylinder, the holes for the supply of the mixture and carbon dioxide purging being arranged at an angle of 180° relative to each other, whereas the hole for the supply of the washing liquid is arranged at an angle of about 30° to 45° to the hole for the supply of the mixture, and the hole for the removal of the cells contents is arranged on the same axis with the hole for the supply of the washing liquid and at an angle of about 30° to 45° to the hole for carbon dioxide purging.

It is advisable that the ends of the pipelines for the supply of the mixture, carbon dioxide purging and the supply of the washing liquid should be arranged inside the measuring cell, the end of the pipeline for the supply of the washing liquid being provided with a nozzle for spraying the washing liquid, whereas the ends of the other two pipelines should be bent so that they are arranged concentrically with respect to the cylindrical surface of the measuring cell, their end faces being one opposite the other.

The system of the present invention provides for complete automation of the operations involved in measurements of radioactivity of labelled biopolymers, which considerably improves the working conditions of those handling radioactive substances, and raises the accuracy of measurements 150 percent, as compared to the known system. In the proposed system, the operations of acid precipitation of biopolymers in a container, filtration of the precipitated sample, and the measurement of radioactivity in the measuring cell and done simultaneously, which makes the measuring process faster and more efficient. In the proposed system, radioactive and toxic substances are transported through pipelines, whereas the filtration and radioactivity measurements are carried out in sealed chambers, which minimizes contamination of the environment with radioactive and toxic substances.

BRIEF DESCRIPTION OF THE ACCOMPANYING DRAWINGS

A better understanding of the present invention may be had from a consideration of the following detailed description of a preferred embodiment thereof, taken in conjunction with the accompanying drawings, wherein.

DETAILED DESCRIPTION OF THE INVENTION

The proposed system for measuring radioactivity of labelled biopolymers comprises a cooling chamber (not shown in FIG. 1) which accomodates a set 1 (FIG. 1) of containers, wherein there are arranged containers 2 with aqueous solutions 3 of biological samples containing biopolymers. The biopolymers are precipitated on particles of diatomite in the presence of a coprecipitator, filtered, dissolved, mixed with a scintillator, and the mixture thus produced is fed to a detection chamber of a radioactivity measuring device 4.

Figure 1:
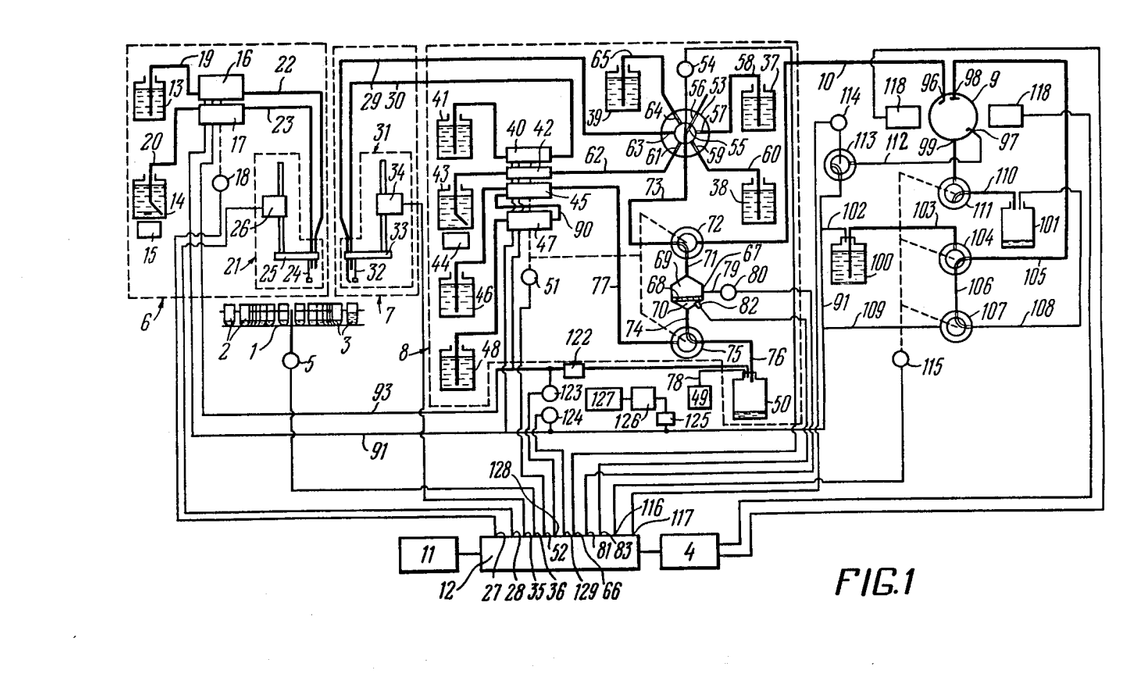
FIG. 1 is a schematic flow chart illustrating a system for measuring radioactivity of labelled biopolymers, in accordance with the invention.

The system further includes an electric drive 5 for setting the set 1 of containers 2 in stepwise motion, a means 6 for acid precipitation of biopolymers for proportioned feeding to the containers 2 with the biological sample of the coprecipitator and a suspension of diatomite in an acid solution, a means 7 for taking precipitated samples from the containers, a means 8 for filtering precipitated biopolymers for successive filtration, suspending of the precipitate, dissolving the biopolymers and feeding, by means of the scintillator, the mixture to the detection chamber which comprises a measuring cell 9 communicating through a pipeline 10 with the means 8 for filtering precipitated biopolymers. The proposed system further includes a program unit 11 for periodic switching on and off the electric drive 5 for setting the set 1 of containers in stepwise motion, the means 6 for acid precipitation of biopolymers, the means 7 for the removal of precipitated samples from the containers 2, the means 8 for filtering precipitated biopolymers, and the radioactivity measuring device 4. The program unit 11 also checks the sequence in which the operations are to be performed.

The system is actuated and different programs, which set the sequence of operations, are selected by the control unit 12, whereto there are connected the program unit 11, the device 4, the means, 6, 7 and 8, and the electric drive 5.

The means 6 for acid precipitation of biopolymers comprises a vessel 13 for a solution of a coprecipitator and a vessel 14 for a suspension of finely divided diatomite in a solution of trichloracetic acid. The vessel 14 is provided with a magnetic stirrer 15. The coprecipitator is a solution of unlabelled biopolymers, for example, a solution of yeast ribonucleic acid. Perchloracetic acid can be used instead of trichloracetic acid. The means 6 further includes two pneumatic batchers 16 and 17 provided with an electromechanical drive 18. The batches 16 and 17 are connected by means of pipelines 19 and 20 to the vessels 13 and 14, respectively.

Arranged above the set 1 of containers is a mechanism 21 for setting in reciprocating motion and adjusting the ends of the pipelines with respect to the container. The mechanism 21 is coupled by means of pipelines 22 and 23 to the respective batchers 16 and 17. The mechanism 21 is provided with a mechanical stirrer 24, a movable member 25 and an electromechanical drive 26 for setting the movable member 25 in reciprocating motion. On the movable member 25 there are mounted the ends of the pipelines 22 and 23. The electromechanical drives 18 and 26 are coupled to respective outputs 27 and 28 of the control unit 12.

The means 7 for taking precipitated samples from the containers comprises a pipeline 29 to pneumatically transfer a precipitated sample from the container 2 to the filtering means 8, and a pipeline 30 to feed a solution of trichloracetic acid to the container 2 in order to wash the container 2 and pipeline 29.

Arranged above the set 1 of containers is a mechanism 31 for setting in reciprocating motion and adjusting the ends of the pipelines with respect to the container with a precipitated sample. The mechanism 31 is provided with a mechanical stirrer 32, a movable member 33 and an electromechanical drive 34 for setting the movable member 33 in reciprocating motion. The ends of the pipelines 29 and 30 are mounted on the movable member 33. The electromechanical drive 34 is coupled to an output 35 of the control unit 12.

The electric drive 5 of the set 1 of containers is connected to an output 36 of the control unit 12.

The means 8 for filtering precipitated biopolymers comprises a vessel 37 for alcohol, a vessel 38 for water, and a vessel 39 for an alcohol-dioxane solution. The means 8 further comprises a pneumatic batcher 40 which is used for a vessel 41 for a solution of trichloracetic acid. The means 8 then includes a pneumatic batcher 42 for a vessel 43 intended for a suspension of diatomite in trochloracetic acid, which is provided with a magnetic stirrer 44. The means 8 still further includes a pneumatic batcher 45 for a vessel 46 intended for a solvent of biopolymers, as well as a pneumatic batcher 47 for a vessel 48 intended for a scintillator, and a vacuum pump 49 with which communicates with a vessel 50 for sucked-off filtrate. The biopolymer solvent is an alcohol-toluene organic base solution.

The magnetic stirrers 15 and 44 are hooked to an a.c. network (not shown in FIG. 1). The pneumatic batchers 40, 42, 45 and 47 are provided with an electromechanical drive 51 connected to an output 52 of the control unit 12.

Provision is also made for a six-way directional control valve 53 with an electromechanical drive 54. A central channel 55 of the valve 53 communicates with the atmosphere through a channel 56; through a channel 57 and a pipeline 58 it communicates with the vessel 37 for alcohol; through a channel 59 and a pipeline 60 it communicates with the vessel 38 for water; through a channel 61 and a pipeline 62 it communicates with the batcher 42; through a channel 63 and the pipeline 29 it communicates with the means 7; and through a channel 64 and a pipeline 65 it communicates with the vessel 39. The drive 54 is connected to an output 66 of the control unit 12.

The means 8 for filtering precipitated biopolymers further includes a filtering chamber 67 having a filtering partition 68 which divides the filtering chamber 67 into two cavities 69 and 70. The cavity 69 communicates through a pipeline 71 to a two-way valve 72 provided with a drive. The valve 72 communicates through a pipeline 73 with the central channel 55 of the valve 53, and through the channel 10 to the measuring cell 9. The cavity 70 communicates through a pipeline 74 with a two-way valve 75 provided with a drive. The valve 75 communicates through a pipeline 76 to the vessel 50 for filtrate, and through a pipeline 77 to the pneumatic batcher 45. The drive 51 of the pneumatic batcher 45 is mechanically coupled to the drives of the valves 72 and 75. The vessel 50 is connected to the vacuum pump 49 by means of a pipeline 78.

The filtering chamber 67 is mounted on an axle 79 extending at a perpendicular to the direction of filtration. The filtering chamber 67 is provided with a drive 80 to rotate it about the axle 79 through an angle of 180°. The drive 80 is connected to an output 81 of the control unit 12. Arranged in the cavity 70 is a level transmitter 82 which indicates the degree to which the chamber 67 is filled. The transmitter 82 is connected to an output 83 of the control unit 12.

Each of the pneumatic batchers 47 (FIG. 2) and 45 for the scintillator and solvent, respectively, comprises a proportioning chamber 84 communicating with the vessels 48 and 46 for liquids being proportioned by means of a pipeline 85 provided with a shut-off valve 86. The end of the pipeline 85 is found inside the proportioning chamber 84, and its position determines the volume of the liquid being proportioned. From below, each chamber 84 communicates with a pipeline 87 for the discharge of a dose of liquid, provided with a shut-off valve 88. On top, the chamber 84 communicates with a pipeline 89 through which it communicates with the atmosphere by means of a valve 90; the chamber 84 also communicates with a line 91 for the supply of compressed carbon dioxide at a stabilized pressure, which is done with the aid of a valve 92; the chamber 84 further communicates with a stabilized vacuum line 93 adapted for evacuation, which is done by means of a valve 94. The valves 86, 88, 90, 92 are switched according to a preselected program by means of the drive 51 (FIG. 1).

Figure 2:
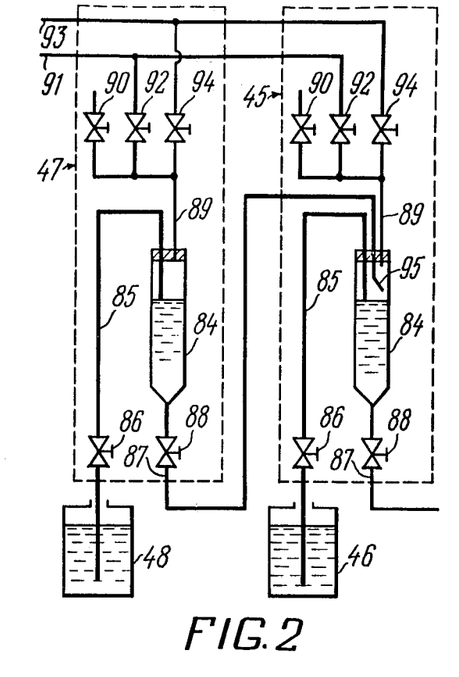
FIG. 2 is a schematic view of apparatus for proportioned feeding of solvent and scintillator, in accordance with the invention.

An end 95 of the pipeline 87 for the discharge of a dose of scintillator from the proportioning chamber 84 of the pneumatic batcher 47 of scintillator is found inside the proportioning chamber 84 of the pneumatic batcher 45 of the solvent; the volume of the pipeline 87 is determined by that of the solvent dose.

The pneumatic batchers 16 (FIG. 1), 17, 40, and 42 are similar to the pneumatic batcher 47 (FIG. 2).

The measuring cell 9 (FIG. 1) is provided with four holes 96, 97, 98 and 99 intended for the supply of the mixture, carbon dioxide purging, the supply of the washing liquid, and the removal of the contents of the cell 9, respectively. There are also a vessel 100 for the washing liquid and a vessel 101 for the discharge of the mixture. The vessel 100 communicates through a pipeline 102 with the line 91 for the supply of compressed carbon dioxide and a line 103 provided with a two-way valve 104 which communicates through a pipeline 105 with the hole 98 of the measuring cell 9, and through a pipeline 106 with a two-way valve 107 through which the pipeline 106 is connected to the atmosphere, which is done through a pipeline 108, or to the line 91, which is done through a pipeline 109.

The vessel 101 communicates through a pipeline 110 with a two-way valve 111 mounted on said pipeline 110. By means of said valve 111 the vessel 101 communicates with the hole 99 of the measuring cell 9.

Through the hole 96, the measuring cell 9 communicates with the pipeline 10 which, in turn, communicates it with the filtering means 8; through the hole 97, the cell 9 communicates with a pipeline 112 having a two-way valve 113, and through them with an electromechanical drive 114. The valve 113 is also connected to the line 91.

The valves 104, 107 and 111 are provided with an electromechanical drive 115 coupled to an output 116 of the control unit 12. The drive 114 is connected to an output 117 of the control unit 12.

The measuring cell 9 is arranged in the detection chamber and interposed between photomultipliers 118 of the radioactivity measuring device 4.

Figure 3:
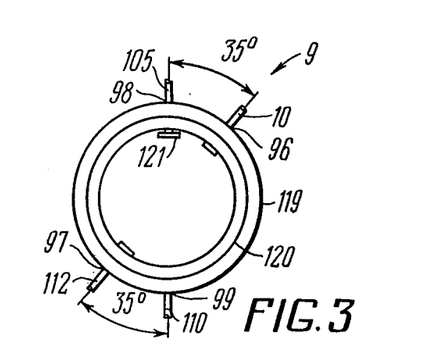
FIG. 3 is a view of a measuring cell in accordance with the invention.

In the embodiment under review, the measuring cell 9 is a hollow cylinder 119 of polyfluoroethylene, whose end faces are covered with a film 120 of polyfluoroethylene. The holes 96 through 99 are provided on the lateral surface of the cylinder 119. The holes 96 and 97 are arranged at an angle of 180° relative to each other; the hole 98 is arranged at an angle of 35° to the hole 96; the hole 99 is arranged on the same axis with the hole 98 and at an angle of 35° to the hole 97.

The ends of the pipelines 10, 112 and 105 are arranged inside the measuring cell 9. The end of the pipeline 105 is provided with a nozzle for spraying the liquid. The ends of the pipelines 10 and 112 are bent so that they are arranged concentrically with respect to the cylindrical surface of the measuring cell 9, their end faces being one opposite the other.

The stabilized vacuum line 93 (FIG. 1) is connected to the vessel 50 for sucking off the filtrate through a pressure stabilizer 122 and is provided with an electrocontact manometer 123.

The line 91 for the supply of compressed carbon dioxide at a stabilized pressure is provided with an electrocontact manometer 124 and connected via a pressure stabilizer 125 and a pressure-reducing valve 126 to a carbon dioxide tank 127. The electrocontact manometers 123 and 124 are connected to inputs 128 and 129 of the control unit 12.

The proposed system for measuring radioactivity of labelled biopolymers operates as follows.

The operator switches on the control unit 12 (FIG. 1) which, in turn, initiates the program unit 11. By a signal from the program unit 11, the means 6 for acid precipitation of biopolymers is brought into play.

Introduced into the first container 2 of the set 1 are the stirrer 24 and the ends of the pipelines 22 and 23 through which the batchers 16 and 17 supply doses of a coprecipitator solution and suspension of diatomite in trichloracetic acid from the vessels 13 and 14. After the contents of the container 2 is mixed, the electromechanical drive 26 is activated, and the ends of the pipelines 22 and 23 and the stirrer 24 are raised. By a signal from the program unit 11, the electric drive 5 is brought into play and moves the set of containers 1 one step. The process is repeated for the next container 2.

In the container 2, the acid precipitation of biopolymers on diatomite particles takes place. After the acid precipitation, the container 2 is transferred to the sample taking station, at which the stirrer 32 and the ends of the pipelines 29 and 30 are introduced into the container 2. After mixing, the contents of the container 2 is pneumatically transferred through the pipeline 29 to the filtering means 8, whereupon the washing solution of trichloracetic acid is supplied to the container 2 from the vessel 41 through the batcher 40. The dose of trichloracetic acid solution is then also transferred through the pipeline 29 to the filtering means 8.

The filtering chamber 67 is first purged with air and washed with alcohol and water; on the filtering partition 68 there is formed an insulating layer of diatomite from the suspension of diatomite in trichloracetic acid, supplied from the vessel 43 through the batcher 42 and the six-way valve 53. Before being filled with diatomite suspension, the filtering chamber 67 is turned about the axle 79 by the drive 20. After the level transmitter 82 is actuated, the chamber 67 resumes its initial position, and the liquid phase of the suspension is sucked off completely through the valve 75 into the vessel 50, whereupon the chamber 67 is again rotated about the axle 79. A sample suspension is introduced into the cavity 69. The level transmitter 82 is actuated, and the chamber 67 resumes its initial position, whereupon there starts the filtration process which ends upon the completion of the revolution.

After the liquid phase of the sample is sucked off completely, the chamber 67 is rotated again, and a solution of trichloracetic acid is introduced thereto from the container 2. After the transmitter 82 is actuated, the chamber 67 resumes its initial position, and the washing solution is sucked off completely. The chamber 67 is then rotated again, and the alcohol-dioxane solution is fed thereto from the vessel 39 in order to remove water and acid ions from the precipitate and thus improve the conditions for suspending the precipitate. The valve 53 then communicates the chamber 67 with the atmosphere; as a result, the alcohol-dioxane solution is sucked into the vessel 50. The chamber 67 resumes its initial position, and the suction process is ended.

The valves 72 and 75 are then switched, and the chamber 67 is communicated with the pipelines 10 and 77. Through the pipeline 77 there takes place successive pneumatic feeding of doses of the solvent and scintillator through the batchers 45 and 47, the valve 74, the chamber 67, the valve 72 and the pipeline 10 to the measuring cell 9. The flow of the solvent suspends the precipitate on the filter 68 and dissolves the biopolymers. After rotating the chamber 67, the dose of the scintillator, which is supplied after the dose of the solvent, forces the suspension with biopolymers dissolved therein from the cavity 69 of the chamber 67 into the measuring cell 9. The chamber 67 then resumes its initial position.

From the line 91, compressed carbon dioxide is fed in a burst-like manner to the measuring cell 9, and the portions of carbon dioxide mix the contents of the cell to provide a uniform mixture, and purge the cell to remove air oxygen dissolved in the mixture, neutralize the organic base and thus rapidly suppress chemiluminescence.

The device 4 then measures the radioactivity and automatically records the result of the measurements.

Under the pressure of compressed carbon dioxide, the mixture is removed from the cell 9 and directed through the pipeline 110 to the vessel 101. After the removal of the mixture from the measuring cell 9, the valve 104 is repeatedly brought into play to communicate the cell 9 with the pipeline 103 through which a washing solution is fed to the cell 9. The washing being over, the valve 107 communicates the cell 9 with the atmosphere to eliminate the excess pressure.

The whole process is repeated for the next sample.

The pneumatic batchers 45 and 47 (FIG. 2) of the solvent and scintillator, respectively, operate as follows.

With the valves 86 and 94 opened and the valves 88, 90 and 92 closed, the chamber 84 is filled so that the level of liquid in it is not higher than the level at which the ends of the pipelines 85 are located.

The valves 94 are then closed, while the valves 90 open. Thus the pressure in the chamber 84 is balanced, and the supply of liquid to said chamber 84 is discontinued. The valve 90 is then closed, and the valve 92 opens in order to communicate the chamber 84 with the line 91 for the supply of compressed carbon dioxane at a stabilized pressure. The excessive amount of the scintillator is discharged from the chamber 84 into the vessel 48, until the level in said chamber 84 is brought down to that of the end of the pipeline 85. The excessive amount of the solvent is discharged from the chamber 84 into the vessel 46 located below the chamber 84; the solvelt level is brought down to that of the end of the pipeline 85, which is done without applying any excess pressure and with the open valve 90. Thus the scintillator and solvent are accurately proportioned.

This is followed by successively feeding the doses of solvent and scintillator, which is done pneumatically, through the pipeline 87.

The valves 90 and 86 close, whereas the valve 92 opens, communicating the solvent chamber 84 with the line 91 for the supply of compressed carbon dioxide; as a result, an excess pressure is produced in the chamber 84 of the pneumatic batcher 45. The valve 88 then opens, and the dose of scintillator is transferred from the chamber 84 of the pnaumatic batcher 45 through the pipeline 87 of the pneumatic batcher 45, whereby the dose of solvent is simultaneously forced into the pipeline 87 of the pneumatic batcher 47. The cubic content of the pipeline 87 is selected so that the feeding of scintillator to the chamber 84 of the pneumatic batcher 47 starts at a moment the discharge of the solvent from said chamber 84 is over.

The measuring cell 9 operates as follows.

The fact that the end of the pipeline 10 (FIG. 1) for the supply of mixture is concentric with the internal cylindrical surface of the measuring cell 9 ensures pneumatic feeding of the mixture along the internal surface of the cell 9 without foam formation; in addition, the mixture is swirled in the direction of feeding. The fact that the end of the pipeline 112 for purging the mixture with an inert gas is also concentric with the internal surface of the measuring cell 9 and extends opposite to the direction in which the mixture is fed accounts for effective mixing and saturation of the mixture with carbon dioxide.

The arrangement of the hole 97 with the pipeline 112 at an angle of 35° relative to the hole 99 for the removal of the contents of the cell 9 makes it possible to purge a maximum amount of the mixture.

An effective saturation of the mixture with carbon dioxide prior to radioactivity measurements accounts for an intensified neutralization of the organic solvent and the removal of oxygen dissolved in the mixture, whereby chemiluminescence is rapidly suppressed.

The measuring cell 9 is rinsed by feeding doses of the washing liquid through the nozzle 121 in a burst-like manner. As a result, a minimum amount of washing liquid is required to effectively wash the internal surface of the cell 9. Due to the fact that the cell 9 is made of polyfluoroethylene, there is practically no sorption of radioactive materials on the internal surface of said measuring cell 9.

The excess pressure brought about in the cell 9 is compensated for by springs (not shown) which press the photocathodes of the photomultipliers 118 to the end faces of the cylinder.

The reliability of the proposed system is ensured by the use of a system for automatically checking the sequence of operations and the pressure in the pneumatic lines. If something goes wrong, the fault is pinpointed and the program unit 11 stops working. When the fault is remedied, the system may go on working without wasting the sample which was being processed at the moment the fault was found.

The proposed system for measuring the radioactivity of labelled biopolymers provided for completely automatic measurements of the radioactivity of aqueous solutions of biological samples containing biopolymers. The system ensures a high accuracy of measurements and minimizes the contamination of the environment and personnel with radioactive and toxic substances.

The system incorporates a stationary measuring cell, which eliminates the necessity of using expensive cells for a liquid scintillation counter.

The pneumatic proportioned feeding of chemically active agents eliminates the presence of these agents in the pipelines during intervals between operations involved in the proportioned feeding of such agents.

As the measuring cell is being filled, the radioactivity is being measured, and the cell's contents is being removed, the next biological sample is prepared to be fed to the measuring cell, which accounts for a shorter measuring process.

The proposed measuring cell design makes it possible to maintain its radioactive background at the normal level over a long period of service; it also accounts for a fast and effective washing of the measuring cell without dismantling it.

The use of the proposed system substantially improves the working conditions and the accuracy of the results obtained by researchers.

What is claimed is:

1. A system for measuring radioactivity of labelled biopolymers, comprising:

a set of containers adapted for receiving aqueous solutions of biological samples containing biopolymers which are subsequently precipitated in said containers on particles of diatomite in the presence of a coprecipitator, then filtered, dissolved, and mixed with a scintillator;

radioactivity measuring means including a detection chamber to which is fed the mixture produced in said set of containers;

an electric drive for moving said set of containers in a stepwise manner;

means for proportioned feeding of said coprecipitator and a suspension of diatomite in an acid solution to said containers which contain the biological sample for forming an acid precipitation of bipolymers;

means for the removal of precipitated samples from said containers;

precipitated biopolymer filtering means for successively filtering the precipitate, suspending the precipitate, dissolving the biopolymers mixed with said scintillator for feeding of the mixture to said detection chamber;

a system of pipelines interconnecting said above-recited means; and said means for measuring radioactivity of labelled biopolymers including, a measuring cell arranged in a detection chamber and communicating with said means for filtering precipitated biopolymers through one pipeline of said system of pipelines; a program unit electrically connected to said electric drive, said means for acid precipitation of biopolymers, said means for the removal of precipitated samples from said containers, said filtering means, and said radioactivity measuring device; said program unit adapted to periodically switch on and off the above-recited means and check the sequence of the radioactivity measuring operations; and a control unit for controlling the initiation of the system and for selecting programs, said control unit being electrically coupled to said program unit, said electric drive, said means for acid precipitation of biopolymers, said means for the removal of precipitated samples from said containers, said means for filtering precipitated biopolymers, and said radioactivity measuring device whereby said means for forming an acid precipitation of biopolymers is activated by initiation of said program unit so that said coprecipitator and suspension of dialomite in an acid solution are proportionately fed to said biological sample containing container to form said precipitate samples at which time said program unit activates said electric drive for moving said set of containers in a stepwise manner, whereupon said precipitate samples are removed from said containers by said removal means and transferred through said pipeline system to said precipitated biopolymer filtering means whereupon the precipitate is filtered, suspended, dissolved in a solvent, and mixed with said scintillator, whereupon the biopolymer containing suspension is conducted to said measuring cell whereupon the radioactivity thereof is measured.

2. A system as claimed in claim 1, wherein said means for acid precipitation of biopolymers comprises:
   a vessel for a solution of a coprecipitator;
   a vessel for a suspension of finely divided diatomite in a solution of trichloracetic acid, provided with a stirrer;
   two pneumatic batchers;
   an electromechanical drive of said pneumatic batchers, connected to said control unit;
   the first of said pneumatic batchers being connected through a pipeline of said system of pipelines to said vessel for a solution of a coprecipitator;
   the second of said pneumatic batchers being connected through a pipeline of said system of pipelines to said vessel for suspension of finely divided diatomite;
   a mechanism for setting in reciprocating motion and adjusting the position of the ends of the pipelines with respect to said containers, provided with a mechanical stirrer for stirring the contents of the containers; said mechanism being communicated by means of pipelines of said system of pipelines with said pneumatic batchers.

3. A system as claimed in claim 1, wherein said means for the removal of samples from said containers comprises:
   a pipeline through which a respective container of said set of containers communicates with said means for filtering precipitated biopolymers, said pipeline being intended to transfer said sample; a pipeline connected to a respective container of said set of containers to feed a solution of trichloracetic acid to said container;
   a mechanism for setting in reciprocating motion and adjusting the position of the ends of the pipelines with respect to said container of said set of containers, containing a precipitated sample, said mechanism being provided with a mechanical stirrer.

4. A system as claimed in claim 1, wherein said means for filtering precipitated biopolymers comprises:
   a vessel for water;
   a vessel for alcohol;
   a vessel for an alcohol-dioxane solution;
   a vessel for a solution of trichloracetic acid, provided with a pneumatic batcher;
   a vessel for a suspension of diatomite in trichloracetic acid, provided with a stirrer and a pneumatic batcher;
   a vessel for a solvent of biopolymers, provided with a pneumatic batcher;
   a vessel for a scintillator, provided with a pneumatic batcher;
   an electromechanical drive coupled to said control unit and interacting with all of said pneumatic batchers;
   a vessel for a filtrate;
   a vacuum pump communicating with said vessel for filtrate;
   a six-way directional control valve provided with an electromechanical drive connected to said control unit;
   a central channel of said six-way directional control valve, successively communicated, with the aid of said electromechanical drive, with the atmosphere, said vessel for alcohol, said vessel for water, said pneumatic batcher of said vessel for a suspension of diatomite in trochloracetic acid, said means for the removal of precipitated samples from said containers, and said vessel for alcohol-dioxane solution;
   a filtering chamber;
   a filtering partition dividing said filtering chamber into two cavities;
   two three-way valves provided with drives to control said valves and mounted on pipelines of said system of pipelines;
   the first of said two cavities of said filtering chamber communicating by means of said pipeline, whereupon there is mounted the first of said two three-way valves, with said central channel of said six-way directional control valve and said measuring cell;
   the second of said two cavities of said filtering chamber communicating by means of the pipeline, whereupon there is mounted the second of said two three-way valves, with said vessel for filtrate and said pneumatic batcher of said vessel for biopolymer solvent;
   said electromechanical drive of said pneumatic batchers being coupled to said drives of said three-way valves.

5. A system as claimed in claim 2, wherein said means for the removal of samples from said containers comprises:
   a pipeline to communicate a respective container of said set of containers with said means for filtering precipitated biopolymers, said pipeline being intended to transfer a precipitated sample;
   a pipeline connected to a respective container of said set of containers to feed a solution of trichloacetic acid to said container;
   a mechanism for setting in reciprocating motion and adjusting the position of the ends of the pipelines with respect to said container with a precipitated sample, provided with a mechanical stirrer.

6. A system as claimed in claim 5, wherein said means for filtering precipitated biopolymers comprises:
   a vessel for water;
   a vessel for alcohol;
   a vessel for an alcohol-dioxane solution;
   a vessel for a solution of trichloracetic acid, provided with a pneumatic batcher;
   a vessel for a suspension of diatomite in trichloracetic acid, provided with a stirrer and a pneumatic batcher;
   a vessel for a solvent of biopolymers, provided with a pneumatic batcher;
   a vessel for a scintillator, provided with a pneumatic batcher;
   an electromechanical drive connected to said control unit and interacting with all of said pneumatic batchers;
   a vessel for filtrate;
   a vacuum pump communicating with said vessel for filtrate;

a six-way directional control valve provided with an electromechanical drive connected to said control unit;

a central channel of said six-way directional control valve, successively communicated with the aid of said electromechanical drive with the atmosphere, said vessel for alcohol, said vessel for water, said pneumatic batcher of said vessel for a suspension of diatomite in trichloracetic acid, said means for the removal of precipitated samples, and said vessel for alcohol-dioxane solution;

a filtering chamber;

a filtering partition dividing said filtering chamber into two cavities;

two three-way valves provided with drives to control said three-way valves and mounted on pipelines of said system of pipelines;

the first of said two cavities of said filtering chamber communicating by means of said pipeline, whereupon there is mounted the first of said two three-way valves, with said central channel of said six-way directional control valve and said measuring cell;

the second of said two cavities of said filtering chamber communicating by means of said pipeline, whereupon there is mounted the second of said two three-way valves, with said vessel for filtrate and said pneumatic batcher of said vessel for a biopolymer solution;

said electromechanical drive of said pneumatic batchers being coupled to said drives of said three-way valves.

7. A system as claimed in claim 1, comprising said measuring cell having a first hole for feeding the mixture, a second hole for carbon dioxide purging, a third hole for the supply of a washing liquid, and a fourth hole for the removal of the cell's contents;

said first hole communicating through the pipeline for the supply of the mixture of said system of pipeline with said filtering means;

a line for the supply of compressed carbon dioxide at a stabilized pressure;

said second hole communicating through the pipeline for carbon dioxide purging of said system of pipelines with said line for the supply of compressed carbon dioxide;

a vessel for a washing liquid, communicating through the pipeline for the supply of washing liquid of said system of pipelines with said third hole;

a vessel for discharged mixture, communicating through the pipeline for the discharge of the cell's contents of said system of pipelines with said fourth hole;

locking means mounted on said pipelines communicating said vessel for washing liquid and said vessel for discharged mixture with said holes of said measuring cell;

an electric drive of said locking means.

8. A system as claimed in claim 4, comprising an axle arranged at a perpendicular to the direction of filtration; said filtering chamber being rigidly mounted on said axle; a drive of said filtering chamber, connected to said control unit and intended to rotate said filtering chamber about said axle through an angle of 180°.

9. A system as claimed in claim 4, comprising a proportioning chamber of said pneumatic batcher of scintillator, communicating by means of a first pipeline of said system of pipelines with said vessel for scintillator;

a proportioning chamber of said pneumatic batcher of solvent, communicating by means of a second pipeline of said system of pipelines with said vessel for biopolymer solvent;

locking means mounted on said first and second pipelines;

a pipeline for the discharge of a dose of liquid, having a locking means of its own and communicating said proportioning chamber of said pneumatic batcher of scintillator with said proportioning chamber of said pneumatic batcher of solvent;

a line for the supply of compressed carbon dioxide at a stabilized pressure;

a stabilized vacuum line;

third and fourth pipelines communicating both of said proportioning chambers with the atmosphere, said line for the supply of compressed carbon dioxide and said stabilized vacuum line, each provided with a locking means.

10. A system as claimed in claim 6, comprising said measuring cell having a first hole for feeding the mixture, a second hole for carbon dioxide purging, a third hole for the supply of a washing liquid, and a fourth hole for the removal of the cell's contents;

said first communicating by means of a pipeline of said system of pipelines with said filtering means;

a line for the supply of compressed carbon dioxide at a stabilized pressure;

said second hole communicating by means of a pipeline of said system of pipelines with said line for the supply of compressed carbon dioxide;

a vessel for washing liquid, communicating through a pipeline of said system of pipelines with said third hole;

a vessel for discharging mixture, communicating through a pipeline of said system of pipelines with said fourth hole;

locking means mounted on said pipelines which communicate said vessel for washing liquid and said vessel for discharged mixture with the respective holes of said measuring cell an electric drive of said locking means, coupled to said drives of said three-way valves.

11. A system as claimed in claim 6, comprising an axle arranged at a perpendicular to the direction of filtration; said filtering chamber being rigidly mounted on said axle; a drive of said filtering chamber, connected to said control unit and intended to rotate said filtering chamber about said axle through an angle of 180°.

12. A system as claimed in claim 6, comprising a proportioning chamber of said pneumatic batcher of scintillator, communicating by means of a first pipeline of said system of pipelines with said vessel for scintillator;

a proportioning chamber of said pneumatic batcher of solvent, communicating by means of a second pipeline of said system of pipelines with said vessel for biopolymer solvent;

locking means mounted on said first and second pipelines;

a pipeline for the discharge of a dose of liquid, provided with a locking means of its own and communicating said proportioning chamber of said pneumatic batcher of scintillator with said proportioning chamber of said pneumatic batcher of solvent;

a line for the supply of compressed carbon dioxide at a stabilized pressure;

a stabilized vacuum line;

third and fourth pipelines communicating both of said proportioning chambers with the atmosphere, said line for the supply of compressed carbon dioxide, and said stabilized vacuum line, each having a locking means of its own.

13. A system as claimed in claim 7, comprising said measuring cell which is a hollow cylinder of polyfluoroethylene; the end faces of said cylinder being covered with a film of polyfluoroethylene; said four holes being provided in the lateral surface of said cylinder; said first and second holes being arranged at an angle of 180° relative to each other; said third hole being arranged at an angle of about 30° to 45° with respect to said first hole; said fourth hole being arranged coaxially with said third hole and at an angle of 30° to 45° with respect to said second hole.

14. A system as claimed in claim 7, wherein the ends of said pipeline for the supply of the mixture, said pipeline for carbon dioxide purging, and said pipeline for the supply of washing liquid are found inside said measuring cell; the end of said pipeline for the supply of washing liquid being provided with a liquid spraying nozzle; the ends of said pipeline for the supply of the mixture and said pipeline for carbon dioxide purging being arranged concentrically with the surface of said measuring cell and facing each other.

15. A system as claimed in claim 10, comprising said measuring cell which is a hollow cylinder of polyfluoroethylene; the end faces of said cylinder being covered with a film of polyfluoroethylene; said four holes being provided on the lateral surface of said cylinder; said first and second holes being arranged at an angle of 180° relative to each other; said third hole being arranged at an angle of about 30° to 45° relative to said first hole; said fourth hole being concentrically with said third hole and at an angle of about 30° to 45° to said second hole.

16. A system as claimed in claim 10, wherein the ends of said pipeline for the supply of the mixture, said pipeline for carbon dioxide purging, and said pipeline for the supply of washing liquid are found inside said measuring cell; the end of said pipeline for the supply of washing liquid being provided with a liquid spraying nozzle; the ends of said pipeline for the supply of the mixture and said pipeline for carbon dioxide purging being arranged concentrically with the surface of said measuring cell and facing each other.

* * * * *